(12) United States Patent
Yamashita et al.

(10) Patent No.: US 12,368,939 B2
(45) Date of Patent: Jul. 22, 2025

(54) IN-VEHICLE CAMERA, CONTROL APPARATUS AND CONTROL METHOD FOR IN-VEHICLE CAMERA, AND IN-VEHICLE CAMERA SYSTEM

(71) Applicant: SONY SEMICONDUCTOR SOLUTIONS CORPORATION, Kanagawa (JP)

(72) Inventors: Yutaro Yamashita, Kanagawa (JP); Satoshi Nakayama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1 day.

(21) Appl. No.: 18/247,091

(22) PCT Filed: Sep. 30, 2021

(86) PCT No.: PCT/JP2021/036114
§ 371 (c)(1),
(2) Date: Mar. 29, 2023

(87) PCT Pub. No.: WO2022/075173
PCT Pub. Date: Apr. 14, 2022

(65) Prior Publication Data
US 2023/0412904 A1    Dec. 21, 2023

(30) Foreign Application Priority Data

Oct. 8, 2020    (JP) .................... 2020-170807

(51) Int. Cl.
*G06V 20/56*     (2022.01)
*G06V 10/141*    (2022.01)
(Continued)

(52) U.S. Cl.
CPC ........... *H04N 23/11* (2023.01); *G06V 10/141* (2022.01); *G06V 10/60* (2022.01)

(58) Field of Classification Search
CPC ........ H04N 23/11; H04N 23/50; H04N 23/12; H04N 23/56; G06V 10/141; G06V 10/60; (Continued)

(56) References Cited

U.S. PATENT DOCUMENTS

| 11,287,784 B1* | 3/2022 | Picardi ................. G07C 5/008 |
| 2008/0230681 A1* | 9/2008 | Yoshizu ............ G06V 40/1312 257/E31.127 |

(Continued)

FOREIGN PATENT DOCUMENTS

| JP | 2002-077694 A | 3/2002 |
| JP | 2002-240629 A | 8/2002 |

(Continued)

OTHER PUBLICATIONS

International Search Report and Written Opinion of PCT Application No. PCT/JP2021/036114, issued on Dec. 21, 2021, 11 pages of ISRWO.

*Primary Examiner* — Howard D Brown, Jr.
(74) *Attorney, Agent, or Firm* — CHIP LAW GROUP

(57) ABSTRACT

This in-vehicle camera includes an infrared light source capable of projecting infrared light, a camera unit including a lens unit and an imaging device unit and having a sensitivity to a wavelength of the infrared light, and a board on which the infrared light source and the camera unit are mounted.

11 Claims, 14 Drawing Sheets

(51) Int. Cl.
    *G06V 10/60*     (2022.01)
    *H04N 23/11*     (2023.01)

(58) Field of Classification Search
    CPC ........ G06V 20/56; G03B 15/00; G03B 15/05; G03B 17/02; G03B 30/00; G08G 1/0133; G08G 1/04; G08G 1/167
    See application file for complete search history.

(56) References Cited

U.S. PATENT DOCUMENTS

| | | | |
|---|---|---|---|
| 2012/0019940 A1* | 1/2012 | Lu | H04N 23/63 359/819 |
| 2014/0205143 A1* | 7/2014 | Zhang | G06V 20/597 382/103 |
| 2019/0297241 A1* | 9/2019 | Kimura | G01B 11/25 |
| 2021/0117706 A1* | 4/2021 | Yamamoto | G06V 20/584 |
| 2021/0190516 A1* | 6/2021 | Ventimiglia | H04L 67/1097 |
| 2022/0089188 A1* | 3/2022 | Tsugawa | G06V 20/58 |
| 2022/0180643 A1* | 6/2022 | Retterath | G06V 10/761 |

FOREIGN PATENT DOCUMENTS

| | | |
|---|---|---|
| JP | 2003-267140 A | 9/2003 |
| JP | 2008-243065 A | 10/2008 |
| JP | 2010-039025 A | 2/2010 |
| JP | 2011-030140 A | 2/2011 |
| JP | 2020-097344 A | 6/2020 |
| JP | 2020-120316 A | 8/2020 |
| WO | 2017/212600 A1 | 12/2017 |

\* cited by examiner

IN-VEHICLE CAMERA, CONTROL APPARATUS AND CONTROL METHOD FOR IN-VEHICLE CAMERA, AND IN-VEHICLE CAMERA SYSTEM

CROSS REFERENCE TO RELATED APPLICATIONS

This application is a U.S. National Phase of International Patent Application No. PCT/JP2021/036114 filed on Sep. 30, 2021, which claims priority benefit of Japanese Patent Application No. JP 2020-170807 filed in the Japan Patent Office on Oct. 8, 2020. Each of the above-referenced applications is hereby incorporated herein by reference in its entirety.

TECHNICAL FIELD

The present technology relates to an in-vehicle camera, a control apparatus and control method for an in-vehicle camera, and an in-vehicle camera system.

BACKGROUND ART

In lane change of a vehicle, a driver visually confirms backward situations of adjacent lanes by using a room mirror, side mirrors, and the like. In recent years, with the development of vehicles without mirrors, there has been known a technique of providing situations of adjacent lanes to a driver through cameras and displays instead of the conventional mirrors. For example, Patent Literature 1 discloses a configuration in which a camera is mounted instead of the side mirrors in a side surface portion such as a front pillar of a vehicle.

By the way, in order to safely use images captured by a side camera for automated driving, object recognition accuracy from those side images is important. In this regard, it is necessary to obtain images with sufficient contrast, but it is difficult to provide lights having sufficient illuminance to the side surfaces of the vehicle because of space limitations.

CITATION LIST

Patent Literature

Patent Literature 1: Japanese Patent Application Laid-open No. 2020-097344

DISCLOSURE OF INVENTION

Technical Problem

In view of the circumstances as described above, it is an object of the present technology to provide an in-vehicle camera, which is small enough to be incorporated in a side surface of a vehicle and can obtain an image having sufficient recognition accuracy for side monitoring, a control apparatus and a control method for such an in-vehicle camera, and an in-vehicle camera system.

Solution to Problem

In order to achieve the above object, an in-vehicle camera according to an embodiment of the present disclosure includes: an infrared light source capable of projecting infrared light; a camera unit including a lens unit and an imaging device unit and having a sensitivity to a wavelength of the infrared light; and a board on which the infrared light source and the camera unit are mounted.

The in-vehicle camera may further include a casing incorporating the board and including a transparent material portion capable of transmitting the infrared light.

The transparent material portion may be bonded to the casing by laser welding.

The camera unit may include a light shielding unit that shields an imaging surface of the imaging device unit from the infrared light of the infrared light source.

The in-vehicle camera according to the embodiment of the present disclosure may further include a serializer including a back channel capable of superimposing control information for the camera unit and control information for the infrared light source and transferring the superimposed control information and a forward channel capable of transferring pixel signals obtained from the camera unit.

The infrared light source may include a plurality of infrared projectors having the same directivity or different directivities.

The transparent material portion of the casing may be disposed on a plane through which an optical axis of the camera unit passes in the casing.

The in-vehicle camera may further include a mirror that deflects light of the infrared light source, the light passing through the transparent material portion, in a direction along an optical axis of the camera unit.

A control apparatus for an in-vehicle camera according to the present disclosure is a control apparatus for an in-vehicle camera disposed on a side surface of a vehicle and including an infrared light source, a camera unit including a lens unit and an imaging device unit and having a sensitivity to a wavelength of infrared light, and a board on which the infrared light source and the camera unit are mounted, the control apparatus including a controller that controls ON of the infrared light source on the basis of a recognition result of an image obtained by the in-vehicle camera.

The controller may be configured to determine whether to perform a left turn or a right turn at an intersection by adding the recognition result of the image obtained by the in-vehicle camera.

The controller may be configured to set the infrared light source of the in-vehicle camera to ON when a surrounding brightness does not satisfy a predetermined condition and when it is determined that overtaking is being planned on the basis of an internal state of the own vehicle.

The controller may be configured to set the infrared light source of the in-vehicle camera to ON when it is determined that a following vehicle turns on a direction indicator.

The controller may be configured to set the infrared light source of the in-vehicle camera to ON when it is determined that there is another approaching vehicle while increasing a relative speed within a predetermined distance behind on another lane.

The controller may be configured to set the infrared light source of the in-vehicle camera to ON when it is determined that there is another approaching vehicle while decreasing a relative speed within a predetermined distance ahead on another lane.

Furthermore, a control method for an in-vehicle camera according to the present technology is a control method for an in-vehicle camera disposed on a side surface of a vehicle and including an infrared light source, a camera unit including a lens unit and an imaging device unit and having a sensitivity to a wavelength of infrared light, and a board on which the infrared light source and the camera unit are mounted, the control method including controlling ON of the infrared light source on the basis of a recognition result of an image obtained by the in-vehicle camera.

Furthermore, an in-vehicle camera system according to the present technology includes: an in-vehicle camera including an infrared light source capable of projecting infrared light, a camera unit including a lens unit and an imaging device unit and having a sensitivity to a wavelength of the infrared light, and a board on which the infrared light source and the camera unit are mounted; and a control apparatus including a controller that controls ON of the infrared light source on the basis of a recognition result of an image obtained by the in-vehicle camera.

MODE(S) FOR CARRYING OUT THE INVENTION

Hereinafter, embodiments according to the present technology will be described with reference to drawings.

First Embodiment

Figure 1:
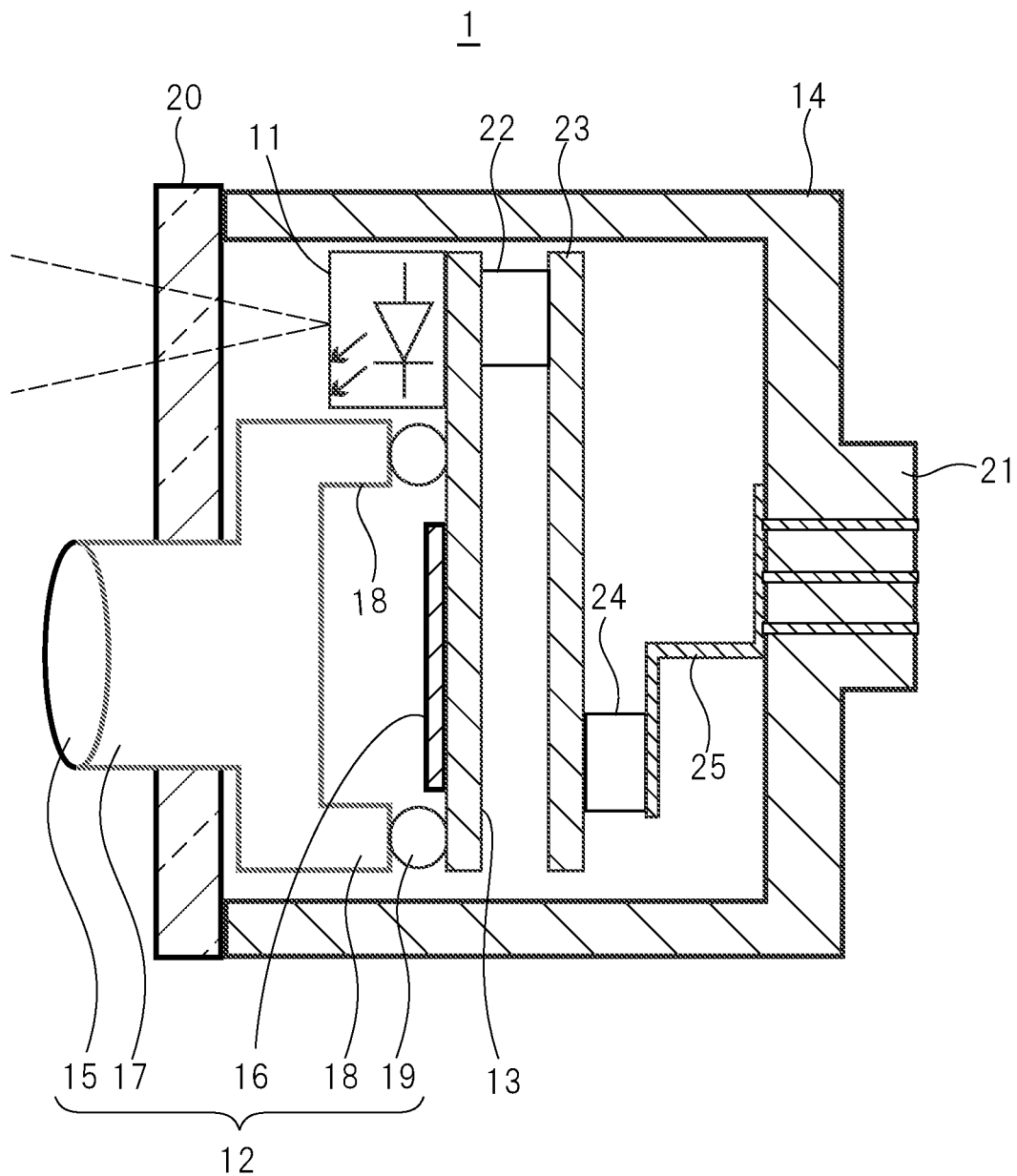
FIG. 1 is a cross-sectional view showing a configuration of an infrared projector-integrated in-vehicle camera according to a first embodiment of the present technology.

FIG. 1 is a cross-sectional view of a configuration of an infrared projector-integrated in-vehicle camera of a first embodiment according to the present technology.

An infrared projector-integrated in-vehicle camera 1 of this embodiment includes an infrared light source 11, a camera unit 12, a main board 13 on which the infrared light source 11 and the camera unit 12 are mounted, and a casing 14 that houses those above components.

The infrared light source 11 is one capable of projecting infrared light, such as an infrared LED.

The camera unit 12 has a sensitivity to the wavelength of the infrared light and includes a lens unit 15, an imaging device unit 16, a lens holder 17, and the like. The imaging device unit 16 may be constituted by, for example, a complementary metal oxide semiconductor (CMOS) image sensor, a charge coupled device (CCD) image sensor, or the like. The lens holder 17 holds the lens unit 15 and includes a light shielding unit 18 that shields the imaging surface of the imaging device unit 16, which is mounted on the main board 13, from the infrared light of the infrared light source 11. The lens holder 17 is disposed so as to be bonded to a surface of the main board 13 in a manner that the bonding portion 19 surrounds the imaging device unit 16 planarly.

In order to project the infrared light coming from the infrared light source 11 to the outside of the casing 14, a surface of the casing 14, though which the optical axis of the camera unit 12 passes, is formed of a transparent material 20. In other words, the casing 14 is fully opened at one end, and a transparent panel is joined at the end surface surrounding the opening so as to close the opening by laser welding or the like. A lens barrel portion of the lens holder 17 is exposed to the outside through a hole portion 20a provided to the transparent material 20 of the casing 14.

Further, a signal connection unit 21 for signal connection with an automated driving recognition ECU, which will be described later, is provided to the surface of the casing 14 opposite to the side where the transparent material 20 is disposed. In the casing 14, a connection board 23 electrically connected to the main board 13 via a first connector 22 is disposed. The connection board 23 is connected to the signal connection unit 21 for signal connection with the automated driving recognition ECU via a second connector 24 and flexible wiring 25. Thus, the imaging device unit 16 and the infrared light source 11, which are mounted onto the main board 13, and the automated driving recognition ECU to be described later are electrically connected to each other.

Figure 2:
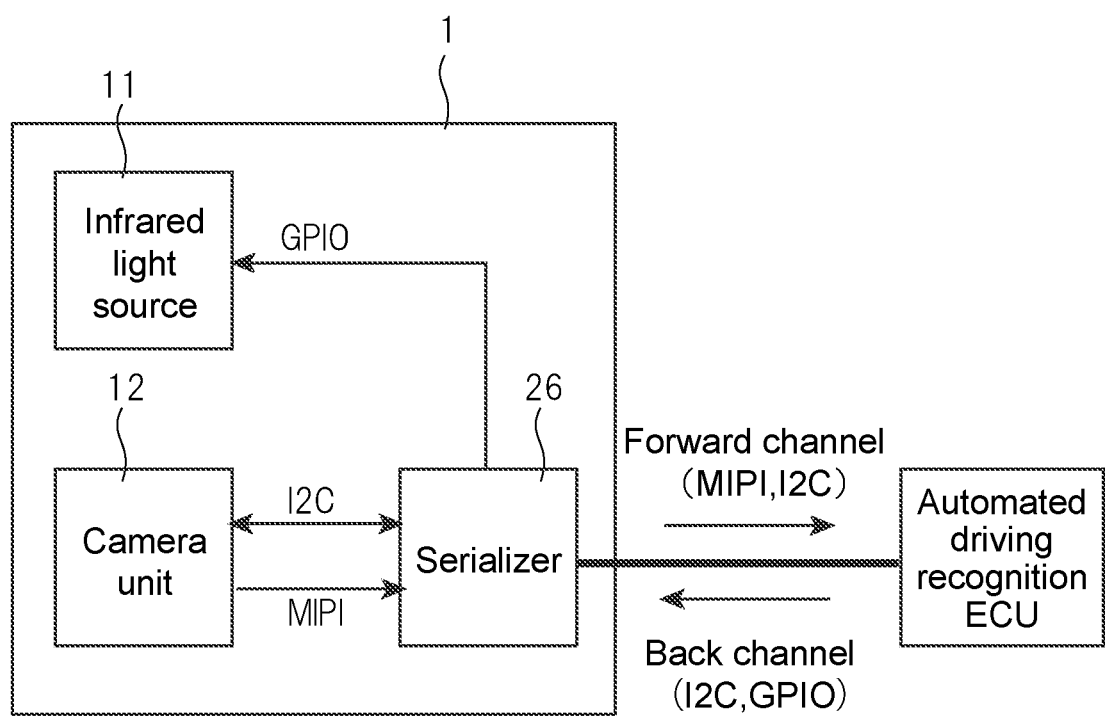
FIG. 2 is a block diagram showing a configuration of signal connection between the infrared projector-integrated in-vehicle camera 1 and an automated driving recognition ECU.

FIG. 2 is a block diagram showing a configuration the signal connection between the infrared projector-integrated in-vehicle camera 1 and the automated driving recognition ECU.

As shown in the figure, the infrared projector-integrated in-vehicle camera and the automated driving recognition ECU are connected to each other via a serializer 26 such as an LVDS serializer. The serializer 26 includes a back channel capable of superimposing control information of the camera unit 12 and control information of the infrared light source 11 and transferring the superimposed control information, and a forward channel capable of transferring pixel signals obtained from the camera unit 12. Note that, for example, an inter-integrated circuit (I2C) or the like may be adopted for a transmission protocol for the control information of the camera unit 12. For example, a mobile industry processor interface (MIPI) or the like may be adopted for a transmission protocol for the pixel signals obtained by the camera unit 12. A general-purpose input/output (GPIO), I2C, or the like can be used for a transmission protocol for the control information of the infrared light source 11.

This makes it possible to reduce the number of wires as a whole because the signal connection wiring for the infrared projector-integrated in-vehicle camera 1 and the automated driving recognition ECU needs one system for each infrared projector-integrated in-vehicle camera 1.

Figure 3:
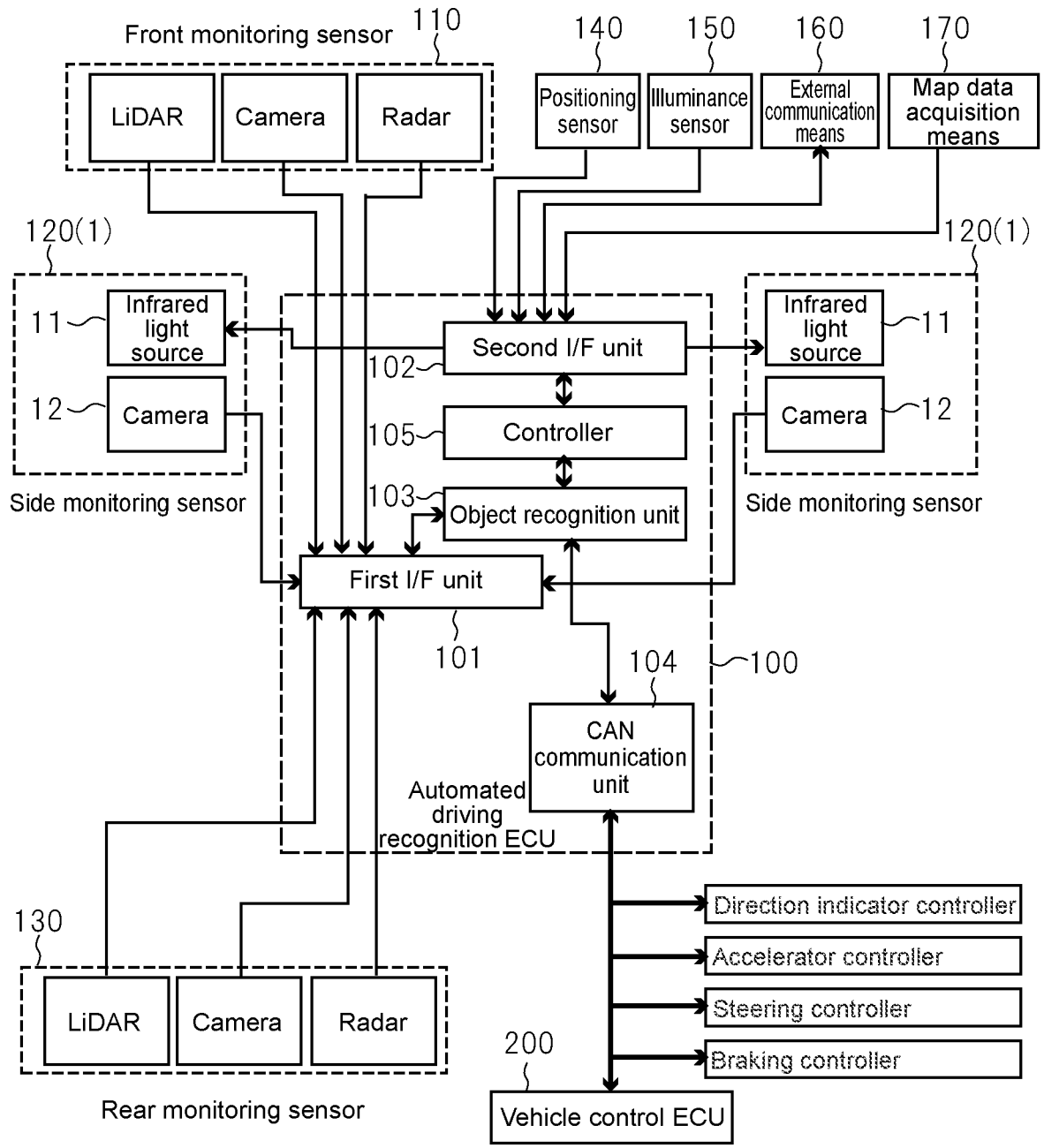
FIG. 3 is a block diagram showing a configuration of a vehicle system in which the infrared projector-integrated in-vehicle camera according to this embodiment is adopted.

FIG. 3 is a block diagram showing a configuration of a vehicle system in which the infrared projector-integrated in-vehicle camera of this embodiment is adopted.

The vehicle system includes an automated driving recognition electronic control unit (ECU) 100, a front inspection sensor 110, side monitoring sensors 120 each including the infrared projector-integrated in-vehicle camera 1 of this embodiment, a rear monitoring sensor 130, a positioning sensor 140, an illuminance sensor 150, external communication means 160 such as the Internet, a map data acquisition means 170, and a vehicle control ECU 200.

The front inspection sensor 110 is a sensor for monitoring the front as viewed from the own vehicle and is, for example, a sensor capable of detecting information necessary to recognize the type, distance, position, and the like of an object located forward by using light detection and ranging (LiDAR), a camera, and radar.

The side monitoring sensor 120 is a sensor for monitoring a lateral side, particularly a rear side on another lane, as viewed from the own vehicle, and includes the infrared projector-integrated in-vehicle camera 1 described above. The side monitoring sensors 120 are disposed to be opposite to each other on the right and left of the own vehicle and may be disposed in the right and left front pillars, for example.

The rear monitoring sensor 130 is a sensor for monitoring the rear as viewed from the own vehicle and is, for example, a sensor capable of detecting information necessary to recognize the type, distance, position, and the like of an object located backward by using LiDAR, a camera, and radar.

The positioning sensor 140 is a sensor that acquires the position of the own vehicle by using, for example, a global positioning system (GPS) and a global navigation satellite system (GNSS).

The illuminance sensor 150 is a sensor that senses the brightness around the own vehicle, and is particularly used for determination in daytime, nighttime, or in a tunnel.

The external communication means 160 is, for example, means for performing communication with a network such as the Internet.

The map data acquisition means 170 is means for acquiring map data necessary for automated driving.

The automated driving recognition ECU 100 is, for example, a controller that controls each unit and generates vehicle control information to be supplied to the vehicle control ECU 200 on the basis of recognition data from the images obtained by the front inspection sensor 110, the side monitoring sensors 120, and the rear monitoring sensor 130, information obtained by the positioning sensor 140, the illuminance sensor 150, the external communication means 160, and the map data acquisition means 170, and further information notified by the vehicle control ECU.

The vehicle control ECU 200 is, for example, a controller that controls each unit of the vehicle, such as a direction indicator, an accelerator, a steering, and a braking, on the basis of the vehicle control information supplied from the automated driving recognition ECU 100.

More specifically, the automated driving recognition ECU 100 includes a first I/F unit 101, a second I/F unit 102, an object recognition unit 103, a controller area network (CAN) communication unit 104, and a controller 105.

The first I/F unit 101 is an interface with the front inspection sensor 110, the side monitoring sensors 120, and the rear monitoring sensor 130. The first I/F unit 101 supplies the images obtained by the front inspection sensor 110, the side monitoring sensors 120, and the rear monitoring sensor 130 to the object recognition unit 103. The second I/F unit 102 is an interface with the infrared light sources 11 in the side monitoring sensors 120, the positioning sensor 140, the illuminance sensor 150, the external communication means 160, and the map data acquisition means 170.

The object recognition unit 103 recognizes the type of an object, a distance from the own vehicle, motion, and the like on the basis of the images obtained by the front inspection sensor 110, the side monitoring sensors 120, and the rear monitoring sensor 130 through the first I/F unit 101.

The CAN communication unit 104 is configured to process communication between the automated driving recognition ECU 100 and the vehicle control ECU 200.

The controller 105 performs control of the infrared light sources 11 in the side monitoring sensors 120, determination on whether to perform a lane change, and determination on whether to perform left turn/right turn at an intersection on the basis of the positioning data, the illuminance data, the acquisition information from the network, the map data acquired from the map data acquisition means 170, which are input via the second I/F unit 102, recognition data of the object recognition unit 103, and the like.

(Control of Infrared Light Source 11)

Next, the control of the infrared light source 11 of the infrared projector-integrated in-vehicle camera 1 of this embodiment will be described.

Figure 4:
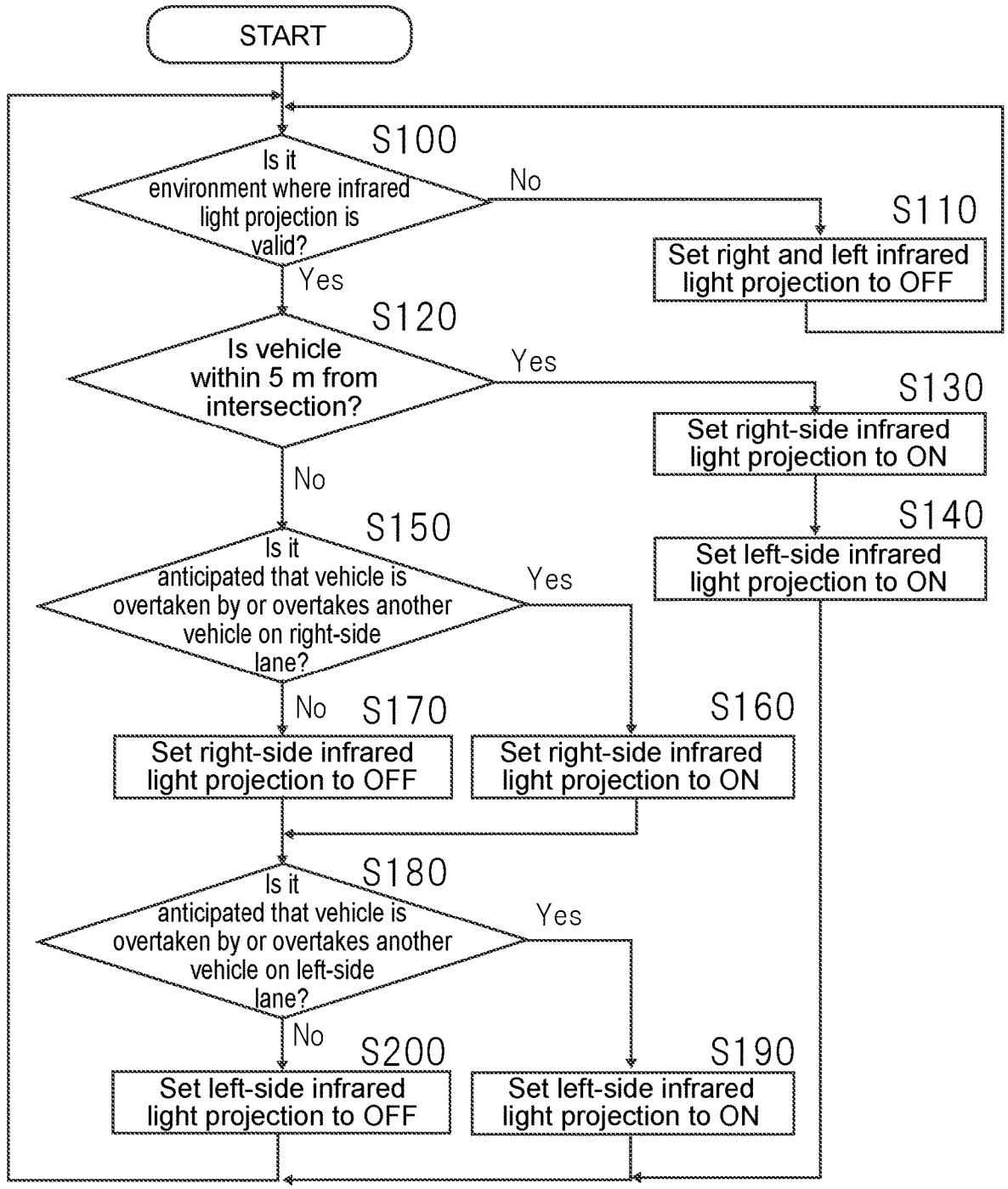
FIG. 4 is a flowchart showing the control of an infrared light source 11.

FIG. 4 is a flowchart showing the control of the infrared light source 11.

The automated driving recognition ECU 100 (hereinafter, referred to as "recognition ECU 100") first determines whether it is an environment where infrared light projection is valid (Step S100). This processing in Step S100 will be described in more detail later. If determining that it is not an environment where infrared light projection is valid, the recognition ECU 100 sets the right and left infrared light sources 11 to OFF (Step S110). Subsequently, the processing returns to the beginning of Step S100.

If determining that it is an environment where infrared light projection is valid, the recognition ECU 100 determines whether or not the own vehicle is within 5 m in front of an intersection (Step S120). This determination may be performed on the basis of, for example, the positioning data acquired by the positioning sensor 140, the map data acquired by the map data acquisition means 170, and the like. If determining that the own vehicle is within 5 m in front of an intersection, the recognition ECU 100 turns on the infrared light sources 11 of the right and left side monitoring sensors 120 (Steps S130, S140), and the processing returns to the beginning of Step S100. In other words, each time it is determined that the own vehicle is about to enter an intersection, the infrared light sources 11 of the right and left side monitoring sensors 120 are set to ON, so that it is provided a situation where images by the cameras 12 of the right and left side monitoring sensors 120 can be obtained. Note that "5 m" is an example, and other predetermined distances may be employed.

If determining that the own vehicle is not within 5 m in front of an intersection, the recognition ECU 100 determines whether it is anticipated that the own vehicle is overtaken by another vehicle running on the right-side lane as viewed from the own vehicle or the own vehicle overtakes another vehicle running on the right-side lane (Step S150). Details of this determination will be described later. If any of the above overtaking is anticipated, the recognition ECU 100 sets the right infrared light source 11 to ON (Step S160). If none of the above overtaking is anticipated, the recognition ECU 100 sets the right infrared light source 11 to OFF (Step S170).

Next, the recognition ECU 100 determines whether it is anticipated that the own vehicle is overtaken by another vehicle running on the left-side lane as viewed from the own vehicle or the own vehicle overtakes another vehicle running on the left-side lane (Step S180). Details of this determination will be described later. If any of the above overtaking is anticipated, the recognition ECU 100 sets the right infrared light source 11 to ON (Step S190). If none of the above overtaking is anticipated, the recognition ECU 100 sets the right infrared light source 11 to OFF (Step S200). Subsequently, the processing returns to the beginning of Step S100.

(Details of Determination in Step S100)

The determination as to whether it is an environment where infrared light projection is valid may be performed as follows, for example.

Figure 5:
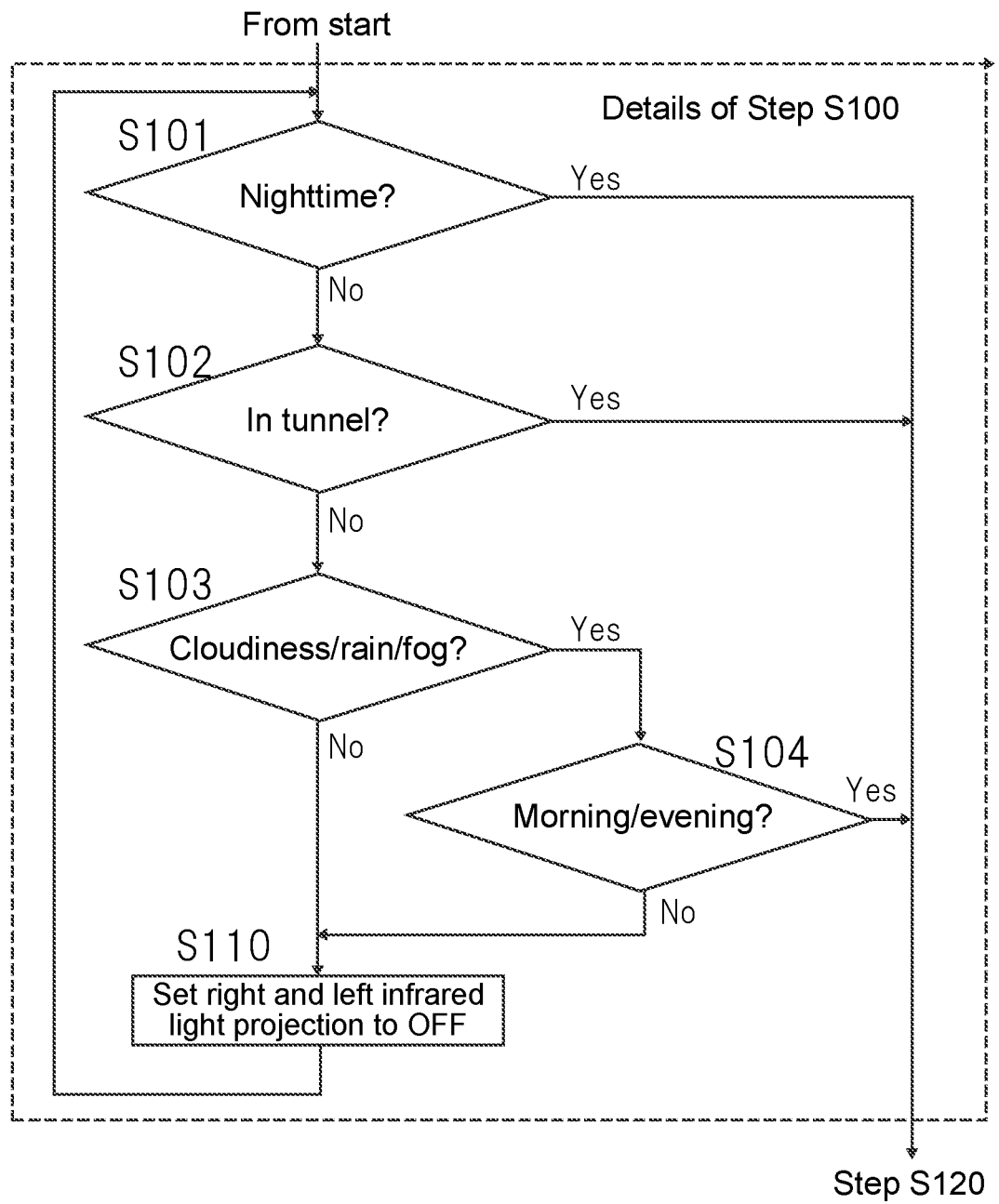
FIG. 5 is a flowchart showing the determination in Step S100.

As shown in FIG. 5, the recognition ECU 100 first determines whether it is daytime or nighttime at the moment from the time of the Internet (Step S101). If it is not nighttime, the recognition ECU 100 determines that it is an environment where infrared light projection is necessary. If it is nighttime, the recognition ECU 100 determines whether the own vehicle is in a tunnel on the basis of the positioning data acquired by the positioning sensor 140 and the map data acquired by the map data acquisition means 170 (Step S102). If the own vehicle is in a tunnel, the recognition ECU 100 determines that it is an environment where infrared light projection is necessary, and sets the right and left infrared light sources 11 to ON. If it is not determined that the own vehicle is in a tunnel, the recognition ECU 100 then checks the occurrence of cloudiness/rain/fog at the place where the own vehicle is located on the basis of the positioning data acquired by the positioning sensor 140 and information acquired from the Internet (Step S103). If cloudiness/rain/fog occurs, the recognition ECU 100 determines whether it is early morning/evening from the time of the Internet (Step S104). If it is early morning/evening, the recognition ECU 100 determines that it is an environment where infrared light projection is valid, and sets the right and left infrared light sources 11 to ON. If cloudiness/rain/fog does not occur, or if cloudiness/rain/fog occurs but it is not early morning/evening, the recognition ECU 100 sets the right and left infrared light sources 11 to OFF.

(Details of Determination in Step S150)

The determination to anticipate overtaking in Step S150 may be performed as follows, for example.

Figure 6:
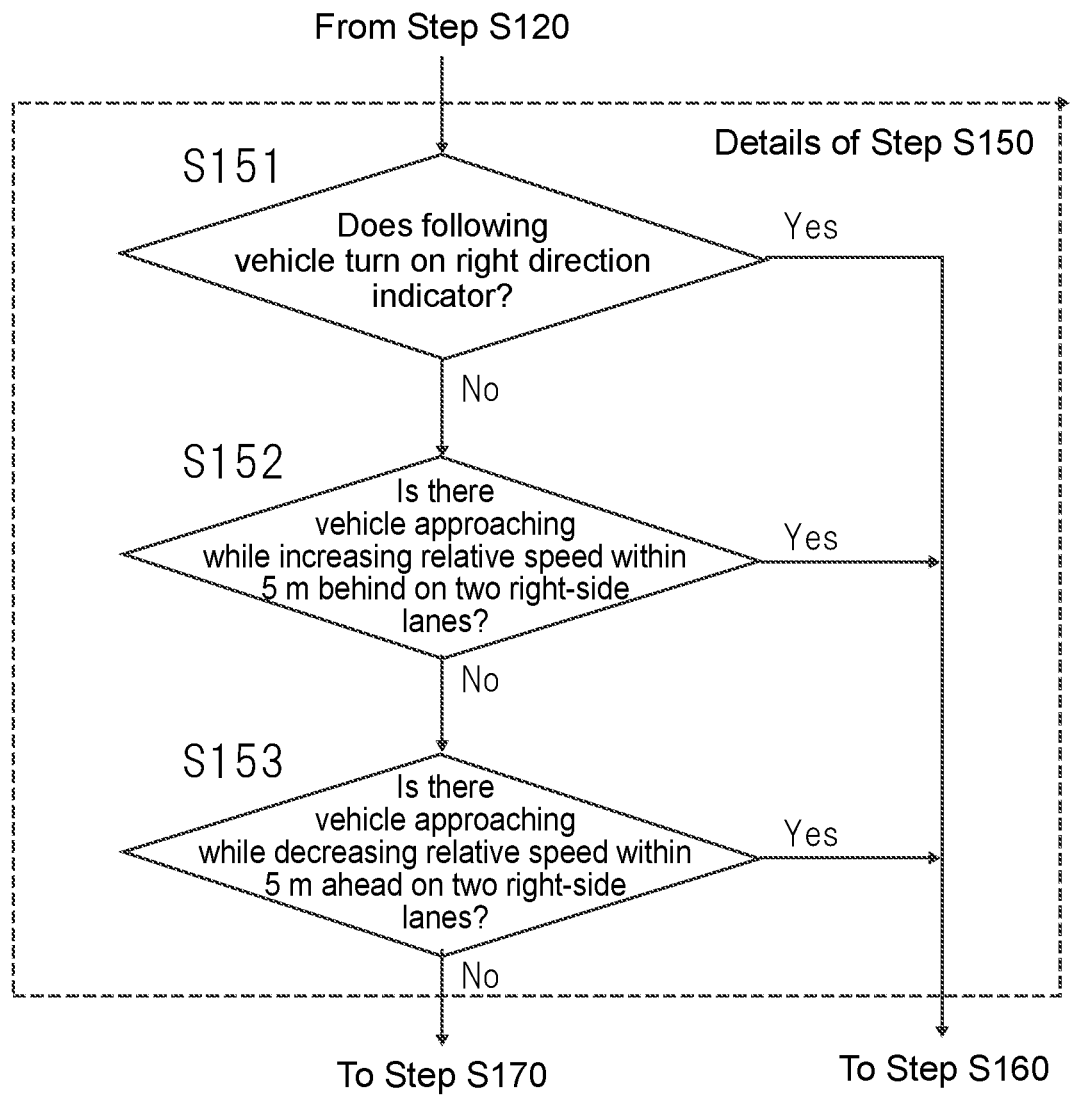
FIG. 6 is a flowchart showing the details of anticipated determination on overtaking in Step S150.

As shown in FIG. 6, the recognition ECU 100 first determines whether or not a following vehicle turns on a right direction indicator on the basis of a rear image captured by a camera of the rear monitoring sensor 130 (Step S151). If a following vehicle turns on a right direction indicator, the recognition ECU 100 sets the right infrared light source 11 to ON in anticipation of overtaking (Step S160). If a following vehicle does not turn on a right direction indicator, subsequently, the recognition ECU 100 determines whether or not there is another vehicle approaching the own vehicle while increasing the relative speed within 5 m behind on the two right-side lanes on the basis of the information obtained by the rear monitoring sensor 130 (Step S152). If it is determined that such a vehicle is found, the recognition ECU 100 sets the right infrared light source 11 to ON in anticipation of overtaking (Step S160). If such a vehicle is not found, subsequently, the recognition ECU 100 determines whether or not there is another vehicle approaching the own vehicle while decreasing the relative speed within 5 m ahead on the two right-side lanes as viewed from the own vehicle on the basis of the information obtained by the front monitoring sensor 101 (Step S153). If it is determined that such a vehicle is found, the recognition ECU 100 sets the right infrared light source 11 to ON (Step S160). If such a vehicle is not found, the recognition ECU 100 sets the right infrared light source 11 to OFF (Step S170).

(Details of Determination in Step S180)

Figure 7:
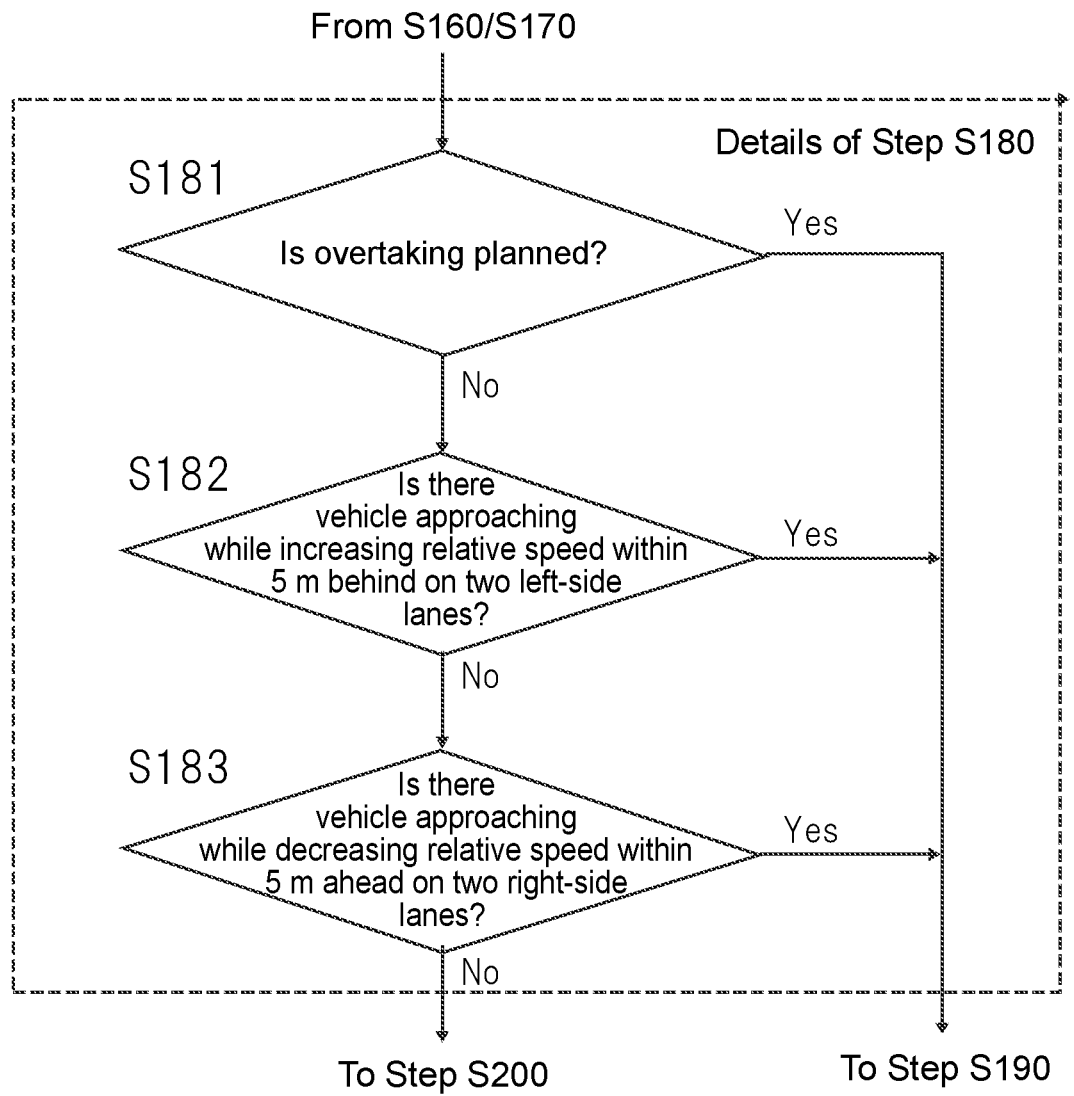
FIG. 7 is a flowchart showing the details of the determination in Step S180.

As shown in FIG. 7, the recognition ECU 100 determines whether or not the own vehicle is planning overtaking on the basis of the inside statuses of the own vehicle, for example, a status of a direction indicator, a traveling speed, a speed change, a steering state, and the like (Step S181). If it is determined that overtaking is being planned, the recognition ECU 100 sets the left infrared light source 11 to ON in anticipation of overtaking (Step S190). If overtaking is not being planned, the recognition ECU 100 determines whether or not there is another vehicle approaching the own vehicle while increasing the relative speed within 5 m behind on the two left-side lanes on the basis of the information obtained by the rear monitoring sensor 103 (Step S182). If it is determined that such a vehicle is found, the recognition ECU 100 sets the left infrared light source 11 to ON in anticipation of overtaking (Step S190). If such a vehicle is not found, subsequently, the recognition ECU 100 determines whether or not there is another vehicle approaching the own vehicle while decreasing the relative speed within 5 m ahead on the two left-side lanes on the basis of the information obtained by the front monitoring sensor 101 (Step S183). If it is determined that such a vehicle is found, the recognition ECU 100 sets the left infrared light source 11 to ON (Step S190). If it is determined that such a vehicle is not found, the recognition ECU 100 sets the left infrared light source 11 to OFF (Step S200).

(Lane Change Control)

Figure 8:
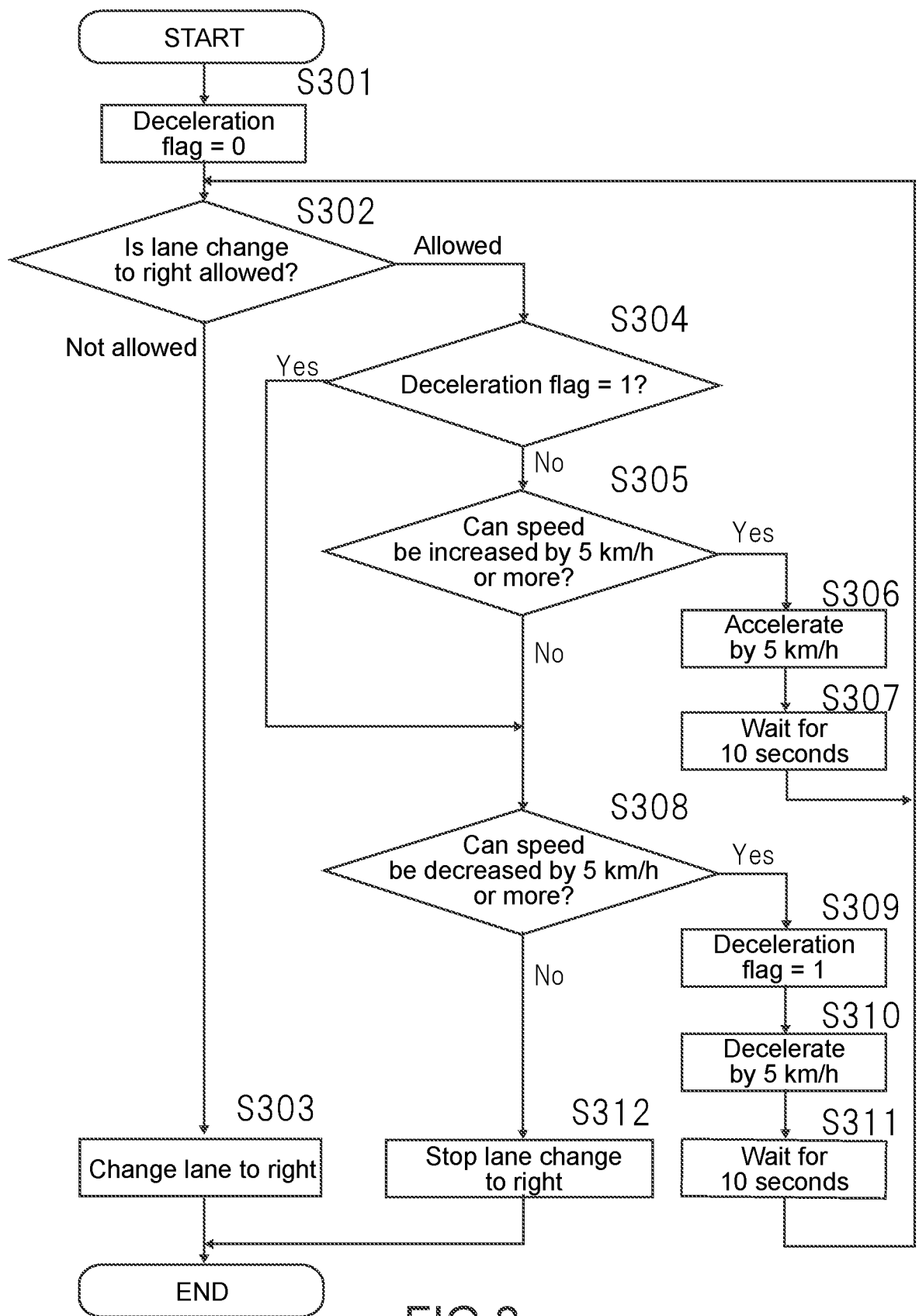
FIG. 8 is a flowchart showing the control of lane change to the right.

FIG. 8 is a flowchart of the control of lane change to the right.

Note that the lane change control is executable when the infrared light sources 11 of the right and left side monitoring sensors 120 are turned ON.

The recognition ECU 100 resets a deceleration flag (Step S301). Next, the recognition ECU 100 determines whether a lane change to the right is allowed (Step S302). Details of this determination will be described later. If it is determined that a lane change is allowed, the recognition ECU 100 outputs control information to the vehicle control ECU 200 so as to perform lane change to the right. Thus, change to a right lane is executed (Step S303).

If it is determined that lane change to the right is not allowed, the recognition ECU 100 determines whether or not the deceleration flag is set (Step S304). The state where the deceleration flag is set means that the own vehicle is decelerating. When the deceleration flag is not set, the recognition ECU 100 determines whether the vehicle speed can be increased by 5 km/h or more on the basis of the vehicle speed, the positioning data, the map data, sign information recognized from a front image obtained by the front monitoring sensor 101, and the like (Step S305). If it is Yes, the recognition ECU 100 outputs the control information to the vehicle control ECU 200 to accelerate by 5 km/h (Step S306), waits for a predetermined period of time, for example, 10 seconds (Step S307), and returns to Step S302.

Further, if the deceleration flag is set or if the vehicle speed fails to be increased by 5 km/h, the recognition ECU 100 determines whether the vehicle speed can be decreased by 5 km/h o more on the basis of the vehicle speed, the positioning data, the map data, sign information recognized from a front image obtained by the front monitoring sensor 101, and the like (Step S308). If the vehicle speed can be decreased, the recognition ECU 100 sets the deceleration flag (Step S309), outputs the control information to the vehicle control ECU 200 to decelerate by 5 km/h (Step S310), waits for a predetermined period of time, for example, 10 seconds (Step S311), and returns to Step S302. If it is impossible to decrease the vehicle speed by 5 km/h or more, the recognition ECU 100 stops the lane change to the right (Step S312).

Figure 9:
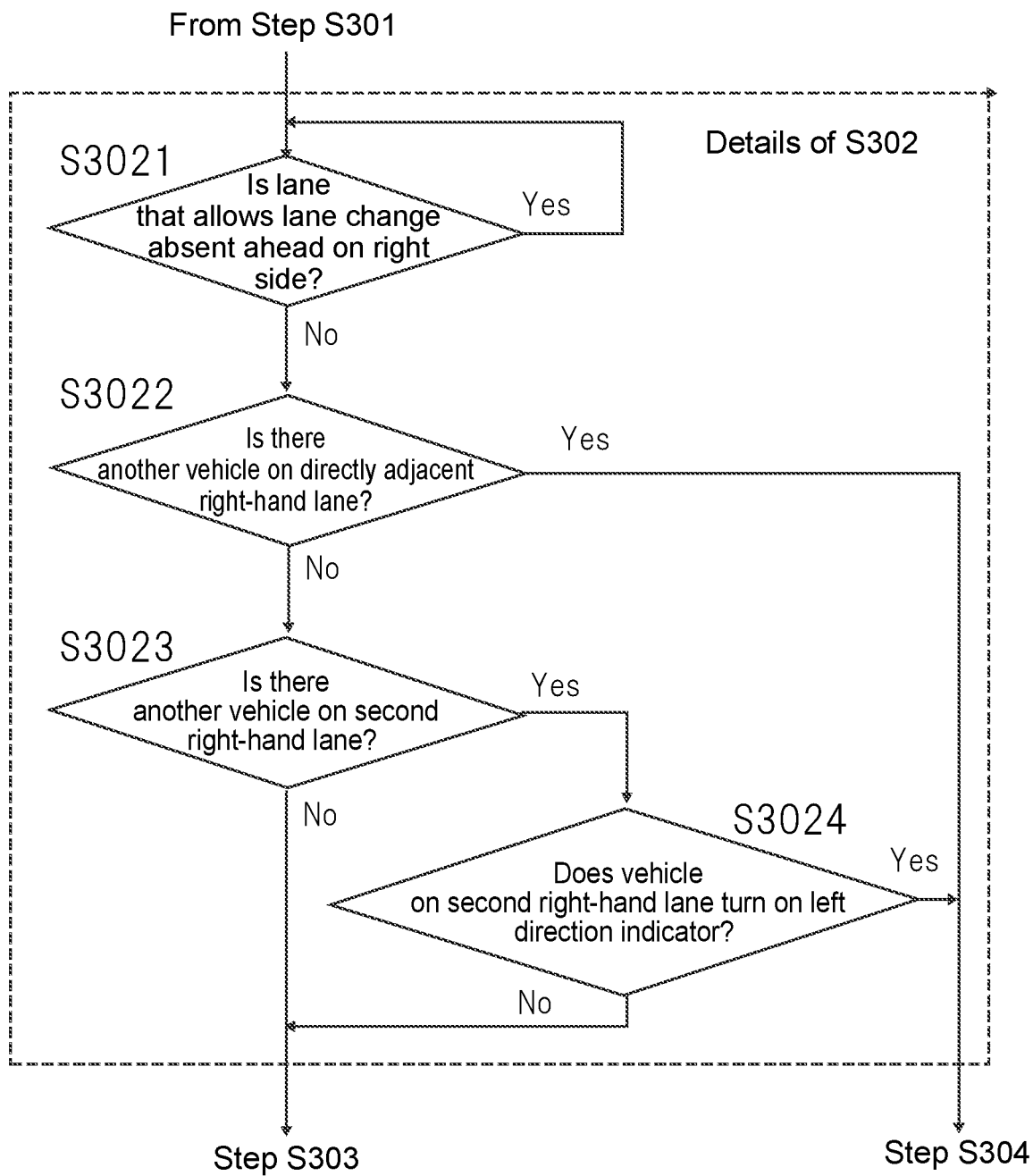
FIG. 9 is a flowchart showing the details of Step S302.

FIG. 9 is a flowchart showing details of Step S302.

The recognition ECU 100 determines whether or not there is a lane that allows lane change ahead on the right as viewed from the own vehicle on the basis of the map data acquired by the map data acquisition means 170 and a front image obtained by the front monitoring sensor 110 (Step S3021). If there is no lane that allows lane change, the recognition ECU 100 returns to Step S3021 again to repeat determination on whether there is a lane that allows lane change. If there is a lane that allows lane change ahead on the right, the recognition ECU 100 determines whether there is another vehicle on a directly adjacent lane on the right as viewed from the own vehicle on the basis of the image obtained by the side monitoring sensor 102 (Step S3022). If there is another vehicle on a directly adjacent lane on the right, the recognition ECU 100 proceeds to the determination in Step 304. If there is no vehicle on a directly adjacent lane on the right, the recognition ECU 100 then determines whether there is another vehicle on the second lane on the right (Step S3023). If the vehicle on the second lane on the right turns on a left direction indicator (Step S3024), the recognition ECU 100 determines that lane change to the right is not allowed and proceeds to Step 304. Further, if there is no vehicle on the second lane on the right or if there is another vehicle but the vehicle does not turn on a left direction indicator, the recognition ECU 100 determines that lane change to the right is allowed and proceeds to Step S303.

Figure 10:
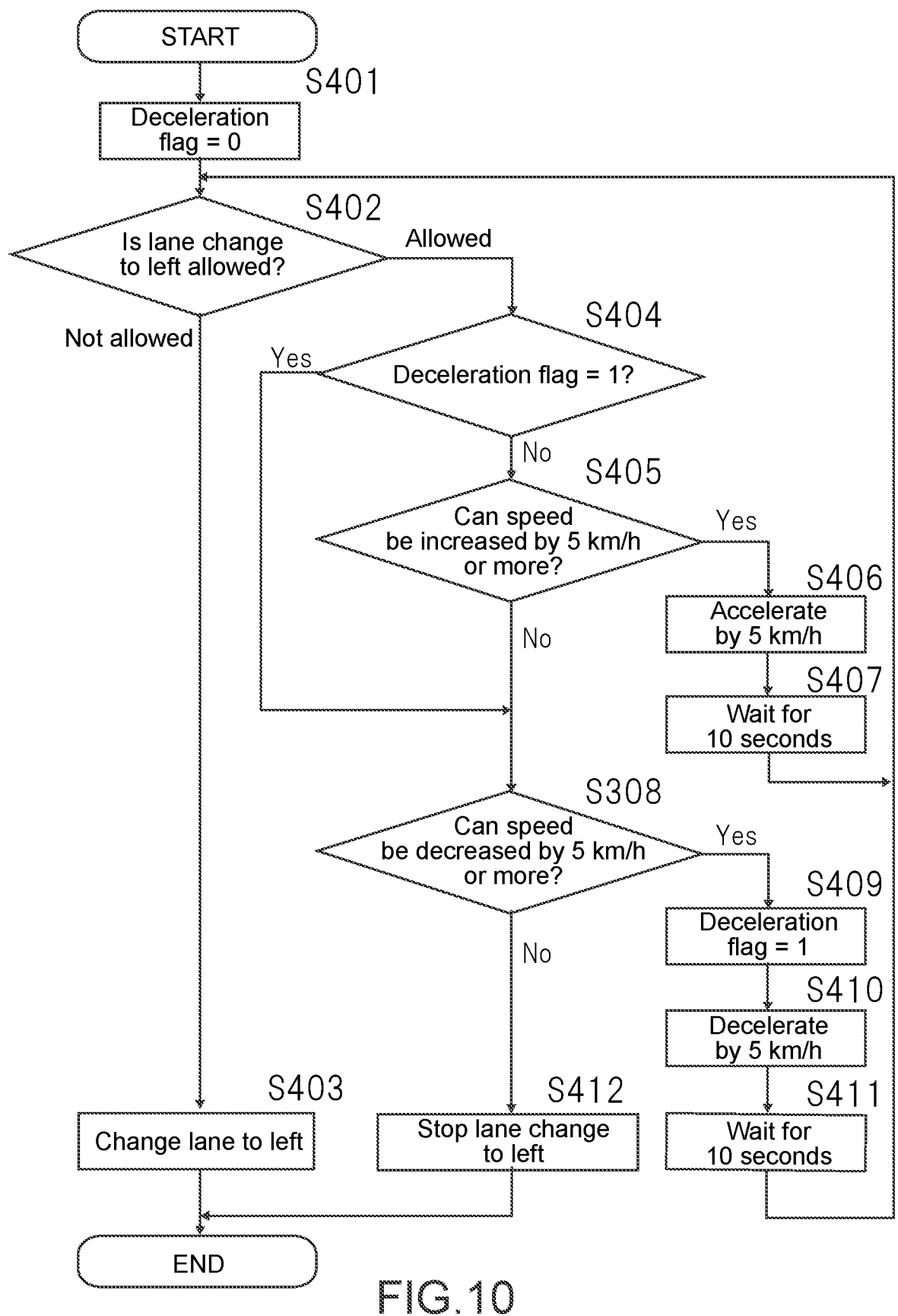
FIG. 10 is a flowchart showing the control of lane change to the left.

FIG. 10 is a flowchart of the control of lane change to the left.

The control of this case is substantially similar to the control of lane change to the right except the difference between the left and the right, and thus the description thereof will be omitted.

(Right/Left Turn Control at Intersection)

Figure 11:
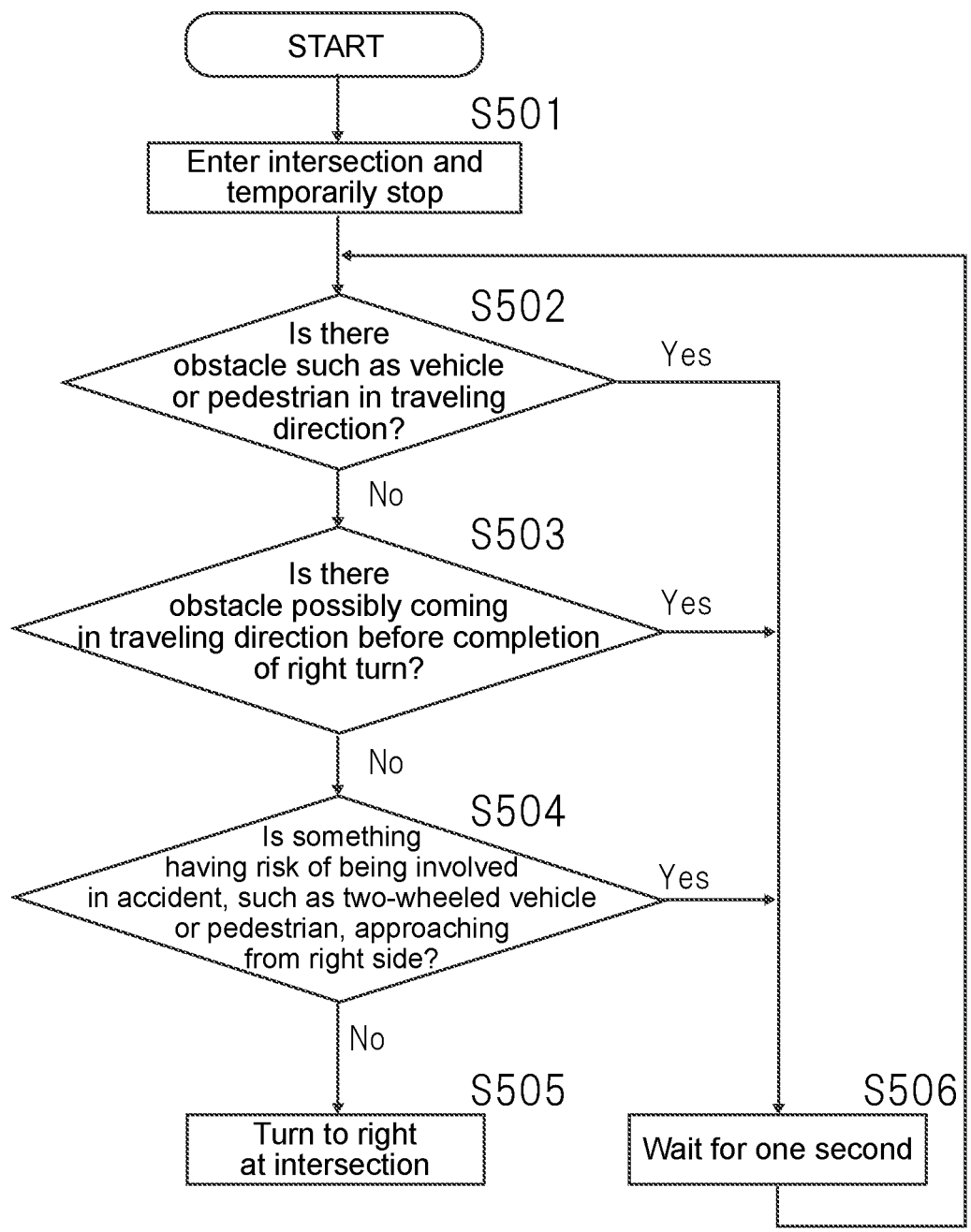
FIG. 11 is a flowchart showing right turn control at an intersection.

FIG. 11 is a flowchart of right turn control at an intersection.

The recognition ECU 100 provides control information to the vehicle control ECU 200 such that the own vehicle enters an intersection and temporarily stops (Step S501). Subsequently, the recognition ECU 100 determines whether or not there is an obstacle such as another vehicle or a pedestrian in the traveling direction on the basis of the image obtained by the front monitoring sensor 101 (Step S502). If it is Yes, the recognition ECU 100 waits for a predetermined period of time, for example, 1 second (Step S506) and returns to the determination in Step S502. If there is no obstacle such as another vehicle or a pedestrian in the traveling direction, the recognition ECU 100 then determines whether or not there is an obstacle such as another vehicle or a pedestrian possibly coming in the traveling direction before completion of the right turn on the basis of the image obtained by the front monitoring sensor 101 (Step S503). If it is Yes, the recognition ECU 100 waits for a predetermined period of time, for example, 1 second (Step S506) as described above, and returns to the determination in Step S502.

If the determination result of Step S503 is No, the recognition ECU 100 then determines whether or not something such as a two-wheeled vehicle or a pedestrian having a risk of being involved in a right-turn accident is approaching from the right side, on the basis of the image obtained by the right side monitoring sensor 102 (Step S504). If it is Yes, the recognition ECU 100 waits for a predetermined period of time, for example, 1 second (Step S506) as described above, and returns to the determination in Step S502. If it is No, the recognition ECU 100 outputs the control information to the vehicle control ECU 200 and causes the own vehicle to turn to the right at the intersection (Step S505).

Figure 12:
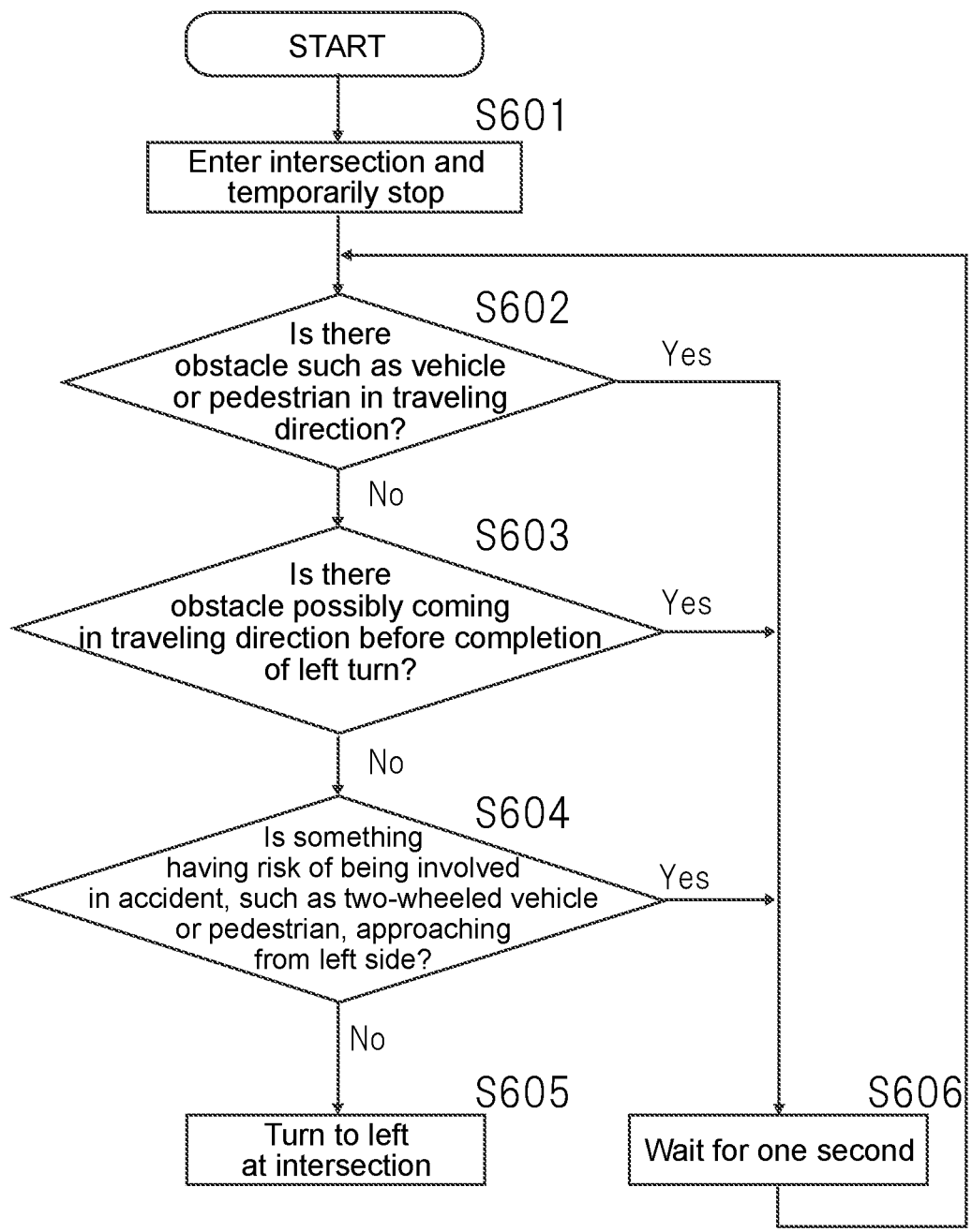
FIG. 12 is a flowchart showing left turn control at an intersection.

FIG. 12 is a flowchart of left turn control at an intersection.

The control of this case is substantially similar to the right turn control at the intersection except the difference between the left and the right, and thus the description thereof will be omitted.

As described above, according to this embodiment, the infrared light sources 11 of the side monitoring sensors 120 are set to ON, for example, during nighttime, in tunnels, or in bad weather, and the side images with sufficient brightness in recognition accuracy can be obtained. This makes it possible to perform safer driving or automated driving by adding the side images to the field of view of a driver or the field of view of automated driving.

Further, the in-vehicle camera 1 of this embodiment achieves a reduction in size by mounting the camera unit 12 and the infrared light source 11 on the same surface of the single main board 13, and can be easily attached to a front pillar or the like of a vehicle.

Modified Example 1

Figure 13:
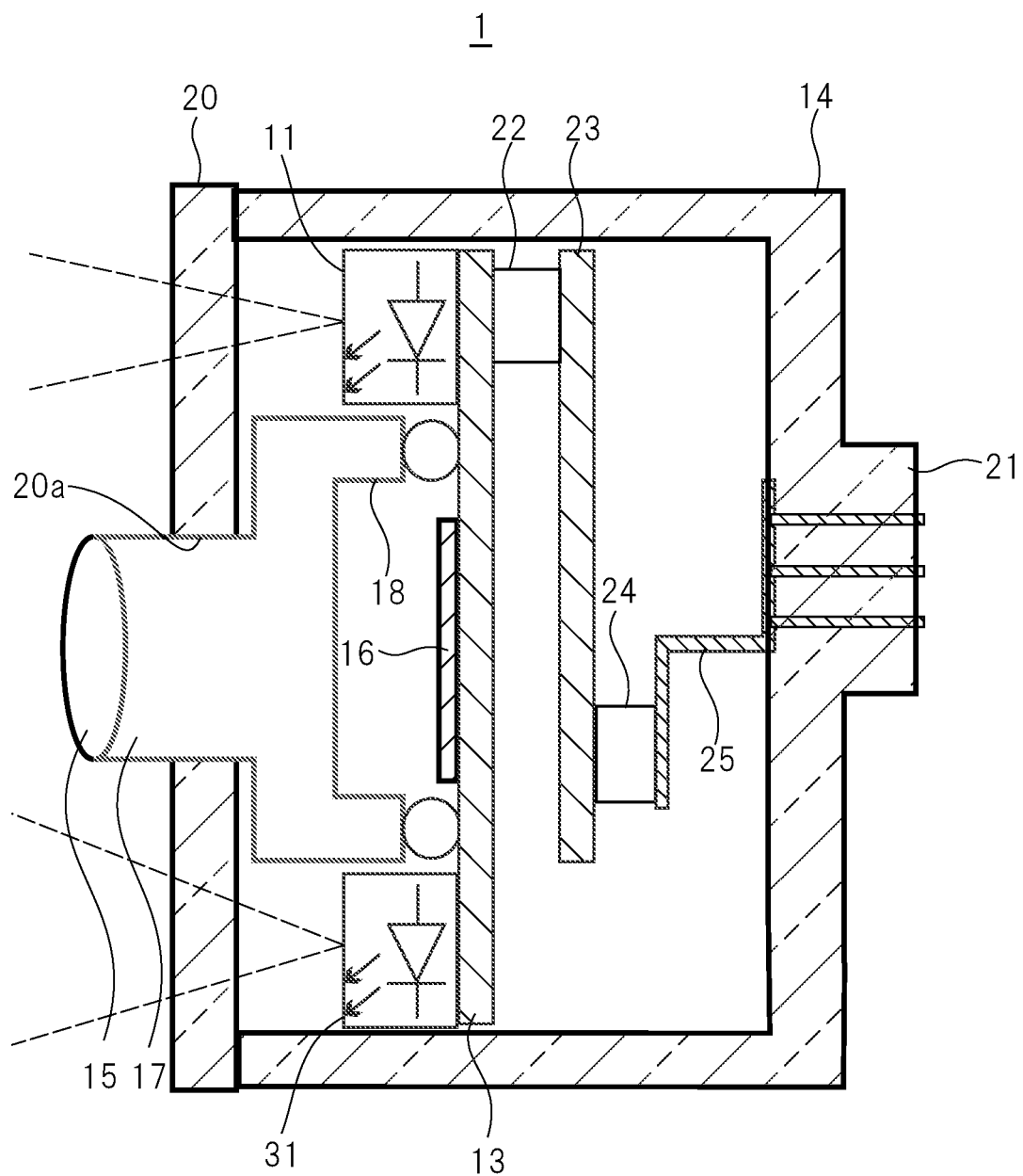
FIG. 13 is a cross-sectional view showing a first modified example of the infrared projector-integrated in-vehicle camera according to the present technology.

FIG. 13 is a diagram showing a modified example of the infrared projector-integrated in-vehicle camera.

Such an infrared projector-integrated in-vehicle camera includes a plurality of infrared light sources 11 and 31. For those plurality of infrared light sources 11 and 31, light sources having different directivities may be adopted. Those plurality of infrared light sources 11 and 31 may be individually selected to be set to ON or may be simultaneously set to ON. Further, the plurality of infrared light sources 11 and 31 may have the same directivity. The plurality of infrared light sources 11 and 31 to be used may be changed in accordance with the recognition accuracy of the side images and the like.

Modified Example 2

Figure 14:
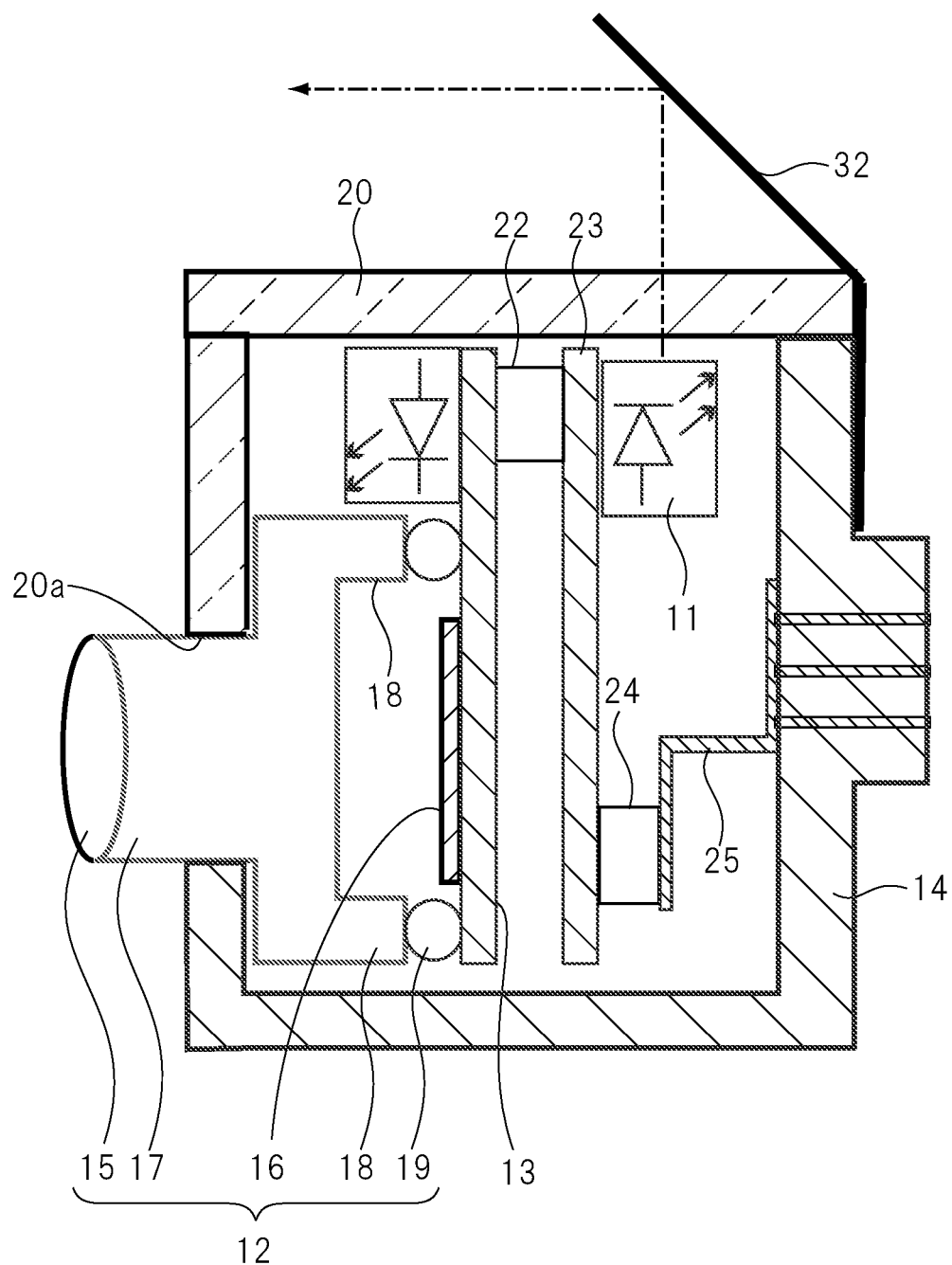
FIG. 14 is a cross-sectional view showing a second modified example of the infrared projector-integrated in-vehicle camera according to the present technology.

In the embodiment described above, the infrared light source 11 is disposed such that the infrared light is applied in the direction along the optical axis of the camera unit 12, and the transparent material 20 is disposed on a plane through which the optical axis of the camera unit 12 of the casing 14 passes. However, for example, as shown in FIG. 14, if a reflective plate 32 is used to change the direction of the infrared light, the direction of the infrared light source 11 and the position of the transparent material 20 of the casing 14 can be changed.

[Another Configuration of Present Technology]

Note that the present technology can have the following configurations.

(1) An in-vehicle camera, including:
- an infrared light source capable of projecting infrared light;
- a camera unit including a lens unit and an imaging device unit and having a sensitivity to a wavelength of the infrared light; and
- a board on which the infrared light source and the camera unit are mounted.

(2) The in-vehicle camera according to (1), further including a casing incorporating the board and including a transparent material portion capable of transmitting the infrared light.
(3) The in-vehicle camera according to (2), in which
the transparent material portion is bonded to the casing by laser welding.
(4) The in-vehicle camera according to any one of (1) to (3), in which
the camera unit includes a light shielding unit that shields an imaging surface of the imaging device unit from the infrared light of the infrared light source.
(5) The in-vehicle camera according to any one of (1) to (4), in which
the infrared light source includes a plurality of infrared projectors having a common directivity or different directivities.
(6) The in-vehicle camera according to any one of (1) to (5), further including
a mirror that deflects light of the infrared light source, the light passing through the transparent material portion, in a direction along an optical axis of the camera unit.
(7) A control apparatus for an in-vehicle camera, the in-vehicle camera being disposed on a side surface of a vehicle and including an infrared light source, a camera unit including a lens unit and an imaging device unit and having a sensitivity to a wavelength of infrared light, and a board on which the infrared light source and the camera unit are mounted, the control apparatus including
a controller that controls ON of the infrared light source on the basis of a recognition result of an image obtained by the in-vehicle camera.
(8) The control apparatus for an in-vehicle camera according to (7), in which
the controller is configured to determine whether to perform a left turn or a right turn at an intersection by adding the recognition result of the image obtained by the in-vehicle camera.
(9) The control apparatus for an in-vehicle camera according to (7) or (8), in which
the controller is configured to set the infrared light source of the in-vehicle camera to ON when a surrounding brightness does not satisfy a predetermined condition and when it is determined that overtaking is being planned on the basis of an internal state of the own vehicle.
(10) The control apparatus for an in-vehicle camera according to any one of (7) to (9), in which
the controller is configured to set the infrared light source of the in-vehicle camera to ON when it is determined that a following vehicle turns on a direction indicator.
(11) The control apparatus for an in-vehicle camera according to any one of (7) to (10), in which
the controller is configured to set the infrared light source of the in-vehicle camera to ON when it is determined that there is another approaching vehicle while increasing a relative speed within a predetermined distance behind on another lane.
(12) The control apparatus for an in-vehicle camera according to any one of (7) to (11), in which
the controller is configured to set the infrared light source of the in-vehicle camera to ON when it is determined that there is another approaching vehicle while decreasing a relative speed within a predetermined distance ahead on another lane.
(13) A control method for an in-vehicle camera, the in-vehicle camera being disposed on a side surface of a vehicle and including an infrared light source, a camera unit including a lens unit and an imaging device unit and having a sensitivity to a wavelength of infrared light, and a board on which the infrared light source and the camera unit are mounted, the control method including
controlling ON of the infrared light source on the basis of a recognition result of an image obtained by the in-vehicle camera.
(14) An in-vehicle camera system, including:
an in-vehicle camera including
an infrared light source capable of projecting infrared light,
a camera unit including a lens unit and an imaging device unit and having a sensitivity to a wavelength of the infrared light, and
a board on which the infrared light source and the camera unit are mounted; and
a control apparatus including
a controller that controls ON of the infrared light source on the basis of a recognition result of an image obtained by the in-vehicle camera.
(15) The in-vehicle camera system according to (14), in which
the in-vehicle camera further includes a casing incorporating the board and including a transparent material portion capable of transmitting the infrared light.
(16) The in-vehicle camera system according to (15), in which
the transparent material portion is bonded to the casing by laser welding.
(17) The in-vehicle camera system according to any one of (14) to (16), in which
the camera unit includes a light shielding unit that shields an imaging surface of the imaging device unit from the infrared light of the infrared light source.
(18) The in-vehicle camera system according to any one of (14) to (17), in which
the infrared light source includes a plurality of infrared projectors having a common directivity or different directivities.
(19) The in-vehicle camera according to any one of (14) to (18), further including
a mirror that deflects light of the infrared light source, the light passing through the transparent material portion, in a direction along an optical axis of the camera unit.

REFERENCE SIGNS LIST 11 infrared light source
12 camera unit
13 main board
14 casing
15 lens unit
16 imaging device unit
17 lens holder
18 light shielding unit
20 transparent material
21 signal connection unit
26 serializer
100 automated driving recognition ECU
105 controller
120 side monitoring sensor

The invention claimed is:
1. An in-vehicle camera, comprising:
an infrared light source configured to project infrared light;
a camera unit that includes:
a lens unit; and an imaging device unit,
  wherein the camera unit has a sensitivity to a wavelength of the infrared light;
a board, wherein the infrared light source and the camera unit are on the board;
a casing that incorporates the board, wherein
  the casing includes a transparent material portion that allows the infrared light to pass through; and
a reflective plate configured to change a first direction of the infrared light projected from the infrared light source to a second direction, wherein
  the second direction is along an optical axis of the camera unit,
  the second direction is different from the first direction, and
  the infrared light in the second direction passes through the transparent material portion.

2. The in-vehicle camera according to claim 1, wherein the transparent material portion is bonded to the casing based on laser welding.

3. The in-vehicle camera according to claim 1, wherein the imaging device unit includes an imaging surface, and the camera unit includes a light shielding unit configured to shield the imaging surface from the infrared light of the infrared light source.

4. The in-vehicle camera according to claim 1, wherein the infrared light source includes a plurality of infrared projectors,
  the plurality of infrared projectors has one of a common directivity or a plurality of directivities, and
  each of the plurality of directivities is different.

5. A control apparatus for an in-vehicle camera, the control apparatus comprising:
  a controller configured to:
    determine a turn-on operation of a direction indicator of a second vehicle based on a first image obtained by a rear monitoring sensor of a first vehicle; and
    turn on an infrared light source included in the in-vehicle camera based on the determination,
  wherein
    the rear monitoring sensor is different from the in-vehicle camera,
    the in-vehicle camera is on the first vehicle,
    the infrared light source and a camera unit are on a board included in the in-vehicle camera, and
    the second vehicle follows the first vehicle.

6. The control apparatus for the in-vehicle camera according to claim 5, wherein
  the controller is further configured to determine a left turn operation of the first vehicle or a right turn operation of the first vehicle at an intersection based on a second image obtained by the in-vehicle camera.

7. The control apparatus for the in-vehicle camera according to claim 5, wherein
  the controller is further configured to turn on the infrared light source of the in-vehicle camera based on a surrounding brightness that does not satisfy a condition and a determination that overtake of a third vehicle by the first vehicle is planned, and
  the determination that the overtake is planned is based on an internal state of the first vehicle.

8. The control apparatus for the in-vehicle camera according to claim 5, wherein
  the controller is further configured to turn on the infrared light source of the in-vehicle camera based on a determination that a third vehicle approaches the first vehicle within a specified distance behind the first vehicle,
  the third vehicle approaches the first vehicle at a relative speed which increases, and
  the third vehicle is on a second lane different from a first lane of the first vehicle.

9. The control apparatus for the in-vehicle camera according to claim 5, wherein
  the controller is further configured to turn on the infrared light source of the in-vehicle camera based on a determination that a third vehicle approaches the first vehicle within a specified distance ahead of the first vehicle,
  the third vehicle approaches the first vehicle at a relative speed which decreases, and
  the third vehicle is on a second lane different from a first lane of the first vehicle.

10. A control method for an in-vehicle camera, the control method comprising
  determining a turn-on operation of a direction indicator of a second vehicle based on an image obtained by a rear monitoring sensor of a first vehicle; and
  turning on an infrared light source included in the in-vehicle camera based on the determination, wherein
    the rear monitoring sensor is different from the in-vehicle camera,
    the in-vehicle camera is on the first vehicle,
    the infrared light source and a camera unit are on a board included in the in-vehicle camera, and
    the second vehicle follows the first vehicle.

11. An in-vehicle camera system, comprising:
  an in-vehicle camera including:
    an infrared light source configured to project infrared light;
    a camera unit that includes:
      a lens unit; and
      an imaging device unit, wherein the camera unit has a sensitivity to a wavelength of the infrared light; and
    a board, wherein the infrared light source and the camera unit are on the board; and
  a control apparatus including
    a controller configured to:
      determine a turn-on operation of a direction indicator of a second vehicle based on an image obtained by a rear monitoring sensor of a first vehicle; and
      turn on the infrared light source based on the determination, wherein
        the rear monitoring sensor is different from the in-vehicle camera,
        the in-vehicle camera is on the first vehicle, and
        the second vehicle follows the first vehicle.

* * * * *